H. NAATZ.
SUSPENSION OF THE CARS OF AIRSHIPS.
APPLICATION FILED APR. 29, 1913.
1,087,134. Patented Feb. 17, 1914.
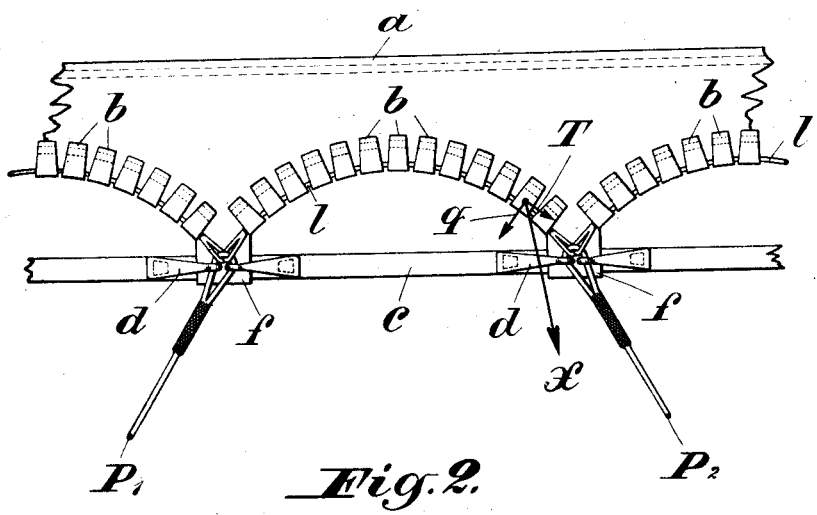
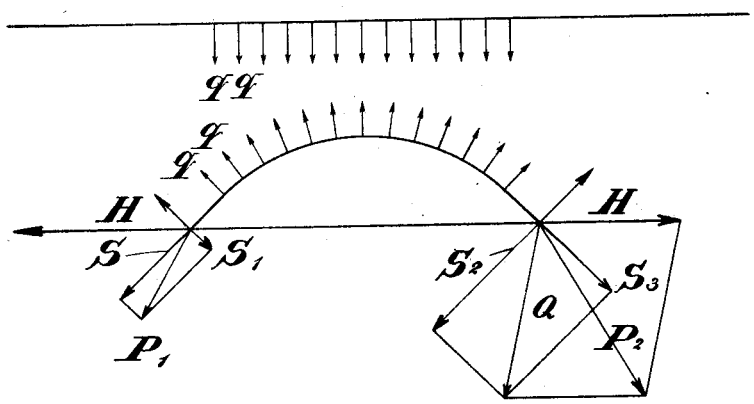

UNITED STATES PATENT OFFICE.

HERMANN NAATZ, OF BITTERFELD, GERMANY, ASSIGNOR TO LUFT-FAHRZENG-GESELLSCHAFT, M. B. H., OF BERLIN, GERMANY.

SUSPENSION OF THE CARS OF AIRSHIPS.

1,087,134. Specification of Letters Patent. Patented Feb. 17, 1914.

Application filed April 29, 1913. Serial No. 764,392.

*To all whom it may concern:*

Be it known that I, HERMANN NAATZ, of Bitterfeld, Germany, a subject of the King of Prussia, and whose post-office address is 12 Kirchstrasse, Bitterfeld, Kingdom of Prussia, German Empire, have invented new and useful Improvements in the Suspension of the Cars of Airships, of which the following is a specification.

Repeatedly attempts have been made to replace the usual sliding loop belt for the suspension of cars of air ships, by leaving out the loops, cutting out the material in the shape of an arc and utilizing the ends of the said arcs as the points from which the car and its load is suspended. This was in accordance with the idea well known in the construction of sails, of transmitting the stresses distributed over the surface of a sail, to a bolt rope. This direct transmission has however the drawback that the stresses in the belt or boom are not distributed in the manner intended. The greatest load is received by the points or ends of the arcs while the arcs themselves carry little. This is due to the fact that by sewing together two portions of fabric and cable, or belt, there is produced a statically indefinite structure in which the cable or band, being a more yielding part, takes up less load, and, as at the ends there is very little material, the fabric takes up the specifically higher stresses. It has also been proposed to carry bolt ropes loosely within a looped conduit formed on the arc shaped edges of the supporting belt and to connect such ropes by means of T-shaped members with the cables carrying the load and with rigid tubular thrust-members distancing the said T-shaped members each from the other.

From this construction the present invention differs by avoiding all rigid thrust members, the whole construction thus taking the shape of a non-rigid net which continuously incloses the body of the balloon.

In the accompanying drawings, Figure 1 is a side view of a broken away part of a supporting belt provided with the device according to the present invention; Fig. 2 is a diagram of forces produced in the system by a suspended load.

The invention is explained in the construction shown by way of example in Fig. 1 of the accompanying drawings where $l$ is the bolt rope, and $b$ are the flaps of the supporting belt $a$, turned upward. Owing to this arrangement, the flaps $b$ can freely slide on the bolt rope when the latter stretches, and always occupy such a position that the lateral component $T$ of the force $x$ acting on a flap becomes either zero or a minimum depending only on slight friction. In other words the flaps $b$ always try to take up a position at right angles to the curvature of the rope. Thus there is produced a statically definite polygon of forces with continuous load, normally directed toward the curve, which load when moreover the curvature is constant, will be constant also in projection, that is to say, at the seam, as shown in Fig. 2. The flaps $b$ receive therefore a load which depends only on the tension in the cable, which is constant through the whole length, and on the curvature. The constancy of the tension is in practice somewhat altered by the friction of the cable in the loops of the flaps, but this is imperceptible, as proved by experiments. A certain slight friction is even desirable in order to equalize small differences between the loads at the single points of engagement. Owing to the loose connection between the belt and the ropes the belt itself can become deformed without affecting the whole distribution of the load.

Instead of the flaps $b$ shown in the drawing and preferably used, it is possible to use a continuous conduit, without departing from the spirit of the invention. The folds produced in that case between the power transmitting places would not have any effect on the specific stress on the fabric of the belt.

In order to keep the stresses on the bolt ropes at their ends as uniform as possible, the points of engagement are further connected together by one tension boom $c$. The connection is effected on the one hand, by the fabric flaps $f$ at the ends of the arc, and on the other hand, by separate loops $d$ on the tension boom engaging with the loops of the cables for the load. The whole construction thus takes the shape of a net which continuously incloses the body of the balloon. Hence the tension boom $c$ enables the load $P^1$, $P^2$ (Fig. 2) to be resolved not only into components in the two cable directions $S$ and $S'$ or $S^2$ and $S^3$, but also into horizontal components $H$, that is to say, in a third direction, as shown on the right hand side in Fig. 2, where for instance the force $P^2$ is resolved into H and Q, and the latter component into $S^2$ and $S^3$, namely in such manner that $S=S^3$.

What I do claim as my invention, and desire to secure by Letters Patent of the United States, is:—

In a device for the suspension of the cars of air ships the combination of a supporting belt having arc shaped edges with bolt ropes carried loosely within a looped conduit formed on the said arc shaped edges and having looped ends engaging with the looped ends of the cables carrying the load, a tension boom carried loosely within looped flaps formed on the supporting belt between the arc shaped edges and provided with loops engaging the looped ends of the cables carrying the load, substantially as set forth.

In testimony whereof I have hereunto set my hand in presence of two subscribing witnesses.

HERMANN NAATZ.

Witnesses:
  FELIX DINGLINGER,
  GEORG V. HERNSDORFF.

hand side in Fig. 2, where for instance the force $P^2$ is resolved into H and Q, and the latter component into $S^2$ and $S^3$, namely in such manner that $S=S^a$.

What I do claim as my invention, and desire to secure by Letters Patent of the United States, is:—

In a device for the suspension of the cars of air ships the combination of a supporting belt having arc shaped edges with bolt ropes carried loosely within a looped conduit formed on the said arc shaped edges and having looped ends engaging with the looped ends of the cables carrying the load, a tension boom carried loosely within looped flaps formed on the supporting belt between the arc shaped edges and provided with loops engaging the looped ends of the cables carrying the load, substantially as set forth.

In testimony whereof I have hereunto set my hand in presence of two subscribing witnesses.

HERMANN NAATZ.

Witnesses:
  FELIX DINGLINGER,
  GEORG V. HERNSDORFF.

---

Correction in Letters Patent No. 1,087,134.

It is hereby certified that the name of the assignee in Letters Patent No. 1,087,134, granted February 17, 1914, upon the application of Hermann Naatz, of Bitterfeld, Germany, for an improvement in "Suspension of the Cars of Airships," was erroneously written and printed as "Luft-Fahrzeng-Gesellschaft," whereas said name should have been written and printed as *Luft-Fahrzeug-Gesellschaft*, as shown by the records of assignments in this office; and that the said Letters Patent should be read with this correction therein that the same may conform to the record of the case in the Patent Office.

Signed and sealed this 3rd day of March, A. D., 1914.

[SEAL.]

J. T. NEWTON,
*Acting Commissioner of Patents.*

It is hereby certified that the name of the assignee in Letters Patent No. 1,087,134, granted February 17, 1914, upon the application of Hermann Naatz, of Bitterfeld, Germany, for an improvement in "Suspension of the Cars of Airships," was erroneously written and printed as "Luft-Fahrzeng-Gesellschaft," whereas said name should have been written and printed as *Luft-Fahrzeug-Gesellschaft*, as shown by the records of assignments in this office; and that the said Letters Patent should be read with this correction therein that the same may conform to the record of the case in the Patent Office.

Signed and sealed this 3rd day of March, A. D., 1914.

[SEAL.]

J. T. NEWTON,

*Acting Commissioner of Patents.*